(12) United States Patent
Fushida

(10) Patent No.: US 10,979,641 B2
(45) Date of Patent: Apr. 13, 2021

(54) IMAGING DEVICE AND IMAGE SHAKE CORRECTING METHOD

(71) Applicant: Sony Corporation, Tokyo (JP)

(72) Inventor: Masahiro Fushida, Kanagawa (JP)

(73) Assignee: Sony Corporation, Tokyo (JP)

( * ) Notice: Subject to any disclaimer, the term of this patent is extended or adjusted under 35 U.S.C. 154(b) by 283 days.

(21) Appl. No.: 16/088,382

(22) PCT Filed: Mar. 24, 2017

(86) PCT No.: PCT/JP2017/012058
§ 371 (c)(1),
(2) Date: Sep. 25, 2018

(87) PCT Pub. No.: WO2017/199582
PCT Pub. Date: Nov. 23, 2017

(65) Prior Publication Data
US 2020/0304715 A1    Sep. 24, 2020

(30) Foreign Application Priority Data

May 16, 2016 (JP) .............................. JP2016-097718

(51) Int. Cl.
*H04N 5/232* (2006.01)
*G02B 27/64* (2006.01)
*G03B 5/00* (2021.01)

(52) U.S. Cl.
CPC ....... *H04N 5/23258* (2013.01); *G02B 27/646* (2013.01); *G03B 5/00* (2013.01);
(Continued)

(58) Field of Classification Search
CPC .. H04N 5/23258; H04N 5/23287; G03B 5/00; G03B 2205/0023; G02B 27/646
See application file for complete search history.

(56) References Cited

U.S. PATENT DOCUMENTS

| 5,541,693 A * | 7/1996 | Enomoto ................. G03B 5/00 |
| | | 396/53 |
| 2002/0112543 A1* | 8/2002 | Noguchi ................. G03B 5/00 |
| | | 73/618 |

(Continued)

FOREIGN PATENT DOCUMENTS

| EP | 3 404 478 A1 | 11/2018 |
| JP | 07-274056 A | 10/1995 |

(Continued)

OTHER PUBLICATIONS

Extended European Search Report dated Feb. 14, 2019 for corresponding European Application No. 17799016.5.

*Primary Examiner* — Timothy J Henn
(74) *Attorney, Agent, or Firm* — Michael Best & Friedrich LLP

(57) ABSTRACT

A suitable drive control of a lens unit for correcting image shake of a captured image is realized. An imaging device includes a lens unit supported rotatably in at least one of a yawing direction or a pitching direction within a casing, and this lens unit is driven by a driving section in at least one of the yawing direction or the pitching direction on a basis of a shake correction driving signal. In this case, the shake correction driving signal is generated by using detection information regarding rotation applied to the casing and detection information regarding rotation occurring on the lens unit in the casing.

17 Claims, 12 Drawing Sheets

(52) U.S. Cl.
CPC ......... *H04N 5/232* (2013.01); *H04N 5/23287* (2013.01); *G03B 2205/0023* (2013.01); *H04N 5/23212* (2013.01)

(56) References Cited

U.S. PATENT DOCUMENTS

| | | |
|---|---|---|
| 2005/0140793 A1 | 6/2005 | Kojima et al. |
| 2009/0034950 A1* | 2/2009 | Takagi ............... H04N 5/23258 396/55 |
| 2012/0154614 A1* | 6/2012 | Moriya .................... G03B 3/00 348/208.5 |
| 2015/0146024 A1 | 5/2015 | Takeuchi |
| 2015/0271410 A1 | 9/2015 | Shintani et al. |
| 2016/0327806 A1* | 11/2016 | Kasamatsu ............ G03B 13/36 |

FOREIGN PATENT DOCUMENTS

| | | |
|---|---|---|
| JP | 10-186434 A | 7/1998 |
| JP | 2009-25481 A | 2/2009 |
| JP | 2013-26681 A | 2/2013 |
| JP | 2013-251862 A | 12/2013 |
| JP | 2015-141390 A | 8/2015 |
| WO | 2014/010303 A1 | 1/2014 |
| WO | 2016/167063 A1 | 10/2016 |

* cited by examiner

FIG. 11
A
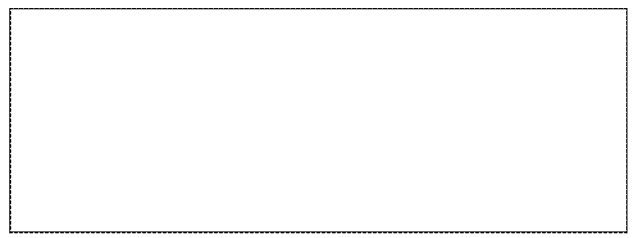
B
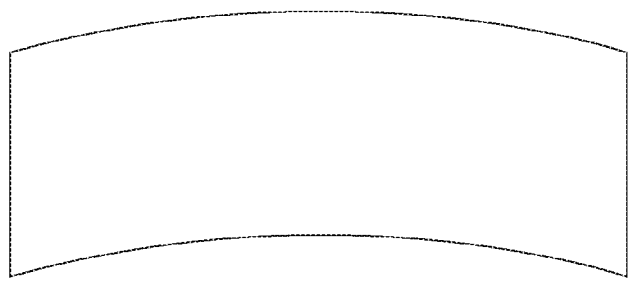
C
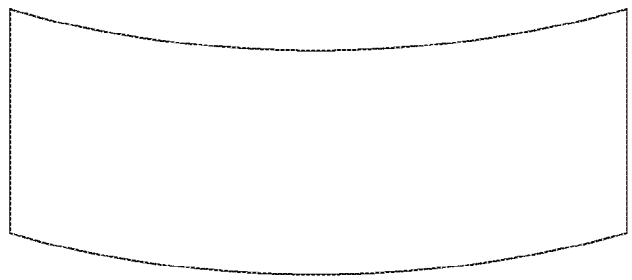
D
E
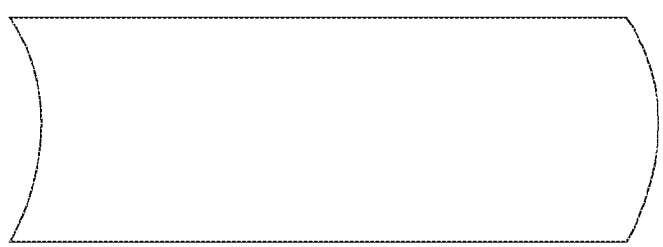

IMAGING DEVICE AND IMAGE SHAKE CORRECTING METHOD

TECHNICAL FIELD

The present technology relates to an imaging device and an image shake correcting method in the imaging device.

BACKGROUND ART

In imaging devices, such as a video camera and a still camera, various technologies for correcting the image shake of a captured image caused by hand shake etc. at the time of imaging, have been proposed. As one of methods for correcting image shake, a method for cancelling shake by moving rotationally an imaging optical system physically relative to shake having been applied to an imaging device has been known.

For example, in a hand shake correction device described in Patent Literature 1, a lens unit including a lens and an image sensor is made rotatable in a pitching direction and a yawing direction. The pitching direction is a direction around a first fulcrum axis orthogonal to the optical axis of the lens, and the second direction is a direction around a second fulcrum axis orthogonal to both the optical axis and the first fulcrum axis. The lens unit is rotated in the yawing direction around the first fulcrum axis as a fulcrum, and, in addition, is rotated in the pitching direction around the second fulcrum axis as a fulcrum, whereby the image shake is corrected.

CITATION LIST

Patent Literature

Patent Literature 1: JP H7-274056A

DISCLOSURE OF INVENTION

Technical Problem

By the way, in the case of correcting image shake by constituting an imaging optical system, such as a lens unit including various kinds of lenses, a diaphragm mechanism, an image sensor, etc. as a movable unit within the casing of an imaging device, in order to drive the movable unit appropriately, it is required to detect rotation causing image shake more correctly.

Then, in the present disclosure, an object is to realize rotation detection for driving a lens unit made a movable unit more appropriately.

Solution to Problem

An imaging device according to the present technology includes: a lens unit supported rotatably in at least one of a yawing direction or a pitching direction within a casing; a first rotation detecting section that detects rotation applied to the casing; a second rotation detecting section that detects rotation occurring on the lens unit within the casing; a shake correction calculating section that generates a shake correction driving signal by using detection information by the first rotation detecting section and detection information by the second rotation detecting section; and a driving section that drives the lens unit in at least one of the yawing direction or the pitching direction on a basis of the shake correction driving signal.

In the case of correcting image shake of a captured image in the imaging device, it is required to detect shake of the lens unit, i.e., rotation in the yawing direction and rotation in the pitching direction appropriately. Then, by using detection information regarding rotation applied to the whole casing and rotation of the lens unit relative to the casing, an amount by which the lens unit is to be driven for correcting image shake, is obtained.

In the above-described imaging device according to the present technology, the shake correction calculating section is considered to generate the shake correction driving signal by using a difference value between the detection information by the first rotation detecting section and the detection information by the second rotation detecting section.

The detection information by the first rotation detecting section becomes information regarding the angle of the shake of the imaging device. The detection information by the second rotation detecting section becomes information in which the shake angle of the imaging device and the angle of the shake of the lens unit within the imaging device are synthesized.

In the above-described imaging device according to the present technology, another lens unit is considered to be disposed on a photographic subject side of the lens unit, and an imaging optical system is formed by the lens unit and the other lens unit. The shake correction calculating section is considered to generate the shake correction driving signal by using a difference value between the detection information by the first rotation detecting section and the detection information by the second rotation detecting section and a value made to reflect a ratio of a correction angle of the lens unit relative to a rotation angle of the casing.

Depending on the relationship with regard to optical property between a lens unit and the other lens unit, a correction angle (angle to be driven for correction) relative to the rotation angle of the lens unit becomes a certain ratio relative to the rotation angle (shake angle) of the casing. Then, the ratio is made to reflect on a shake correction driving signal.

In the above-described imaging device according to the present technology, the lens unit is considered to be disposed in a sealed state within the casing.

That is, the lens unit is not structured to be driven rotationally in a state where its part is directly exposed in the case of being seen from the outside of the casing.

In the above-described imaging device according to the present technology, the lens unit is considered to be disposed in a sealed state within the casing by attaching another lens unit with a state that a photographic subject side of the lens unit is blocked by the another lens unit.

That is, the imaging optical system is formed by the lens unit and the other lens unit. In this case, the other lens unit is made a state of being fixed to the casing. The photographic subject side is blocked by the other lens unit so that the lens unit supported rotatably is not directly exposed in the case of being seen from the outside of the casing.

In the above-described imaging device according to the present technology, an image processing section that performs image processing for a captured image signal acquired by the lens unit is considered to be included. The image processing section is considered to perform image distortion correction for a captured image signal by using a difference value between the detection information by the first rotation detecting section and the detection information by the second rotation detecting section obtained by the shake correction calculating section.

In the case where the imaging optical system is separated into the lens unit supported rotatably and the other lens unit fixed to the casing, dynamic image distortion occurs correspondingly to shake. This is corrected by the image processing.

In the above-described imaging device according to the present technology, the first rotation detecting section and the second rotation detecting section are considered to be angular velocity sensors.

For example, the first rotation detecting section detects the rotation of the casing as angular velocities of the casing, in the yawing direction and the pitching direction, obtained by a biaxial angular velocity sensor (gyro sensor).

The second rotation detecting section also detects the rotation of the lens unit as angular velocities of the lens unit, in the yawing direction and the pitching direction, obtained by a biaxial angular velocity sensor (gyro sensor).

In the above-described imaging device according to the present technology, the first rotation detecting section is considered to be an angular velocity sensor. The second rotation detecting section is considered to be a position sensor using a hall element.

The second rotation detecting section that detects the shake of the lens unit relative to the casing, may be made a position sensor using the hall element.

An image shake correcting method according to the present technology is an image shake correcting method of an imaging device equipped with a lens unit supported rotatably in at least one of a yawing direction or a pitching direction within a casing and a driving section that drives the lens unit in at least one of the yawing direction or the pitching direction on a basis of a shake correction driving signal, and includes: performing processing of generating the shake correction driving signal by using detection information regarding rotation applied to the casing and detection information regarding rotation occurring on the lens unit within the casing.

Advantageous Effects of Invention

According to the present technology, a suitable constitution for the driving control of the lens unit for image shake correction can be realized. That is, in order to drive the lens unit correctly, rotation causing image shake can be detected more correctly.

In this connection, the effects described here should not be limited, and may be any of effects described in the present disclosure.

BRIEF DESCRIPTION OF DRAWINGS

FIG. 11 is an explanatory illustration of dynamic image distortion.

MODE(S) FOR CARRYING OUT THE INVENTION

Hereinafter, an embodiment will be described in the following order.
<1. Outline of image shake correction by rotation of lens unit>
<2. Structural example of movable side lens unit>
<3. Constitution of imaging device in first embodiment>
<4. Constitution of imaging device in second embodiment>
<5. Conclusion and modified embodiment>

1. Outline of Image Shake Correction by Rotation of Lens Unit

Figure 1:
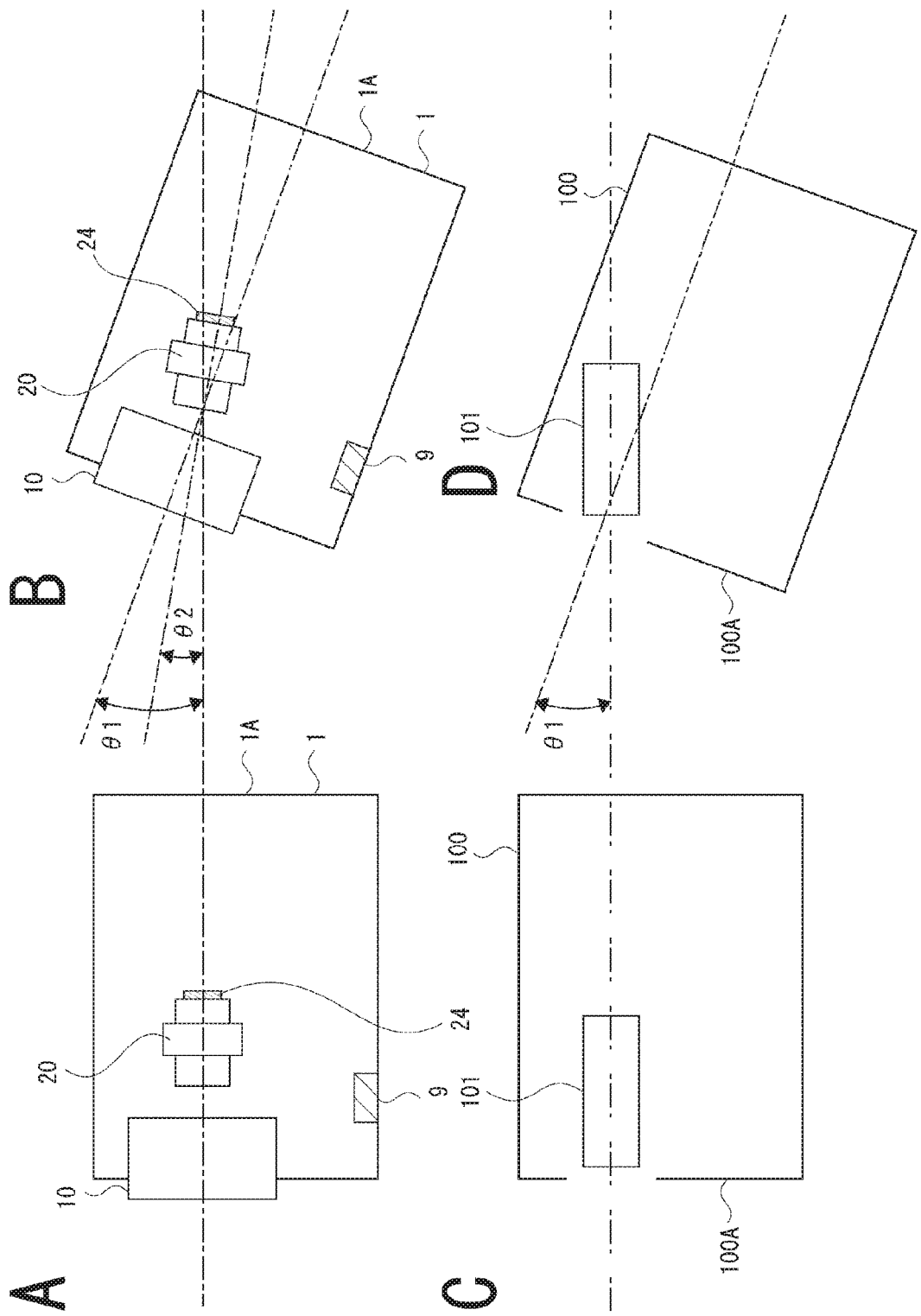
FIG. 1 is an explanatory illustration of a constitution of a lens unit in an embodiment of the present technology.

FIG. 1A and FIG. 1B show schematically a fixed side lens unit 10 and a movable side lens unit 20 that are mounted on an imaging device 1 in the present embodiment.

In the imaging device 1 in the present embodiment, an imaging optical system is divided into the fixed side lens unit 10 and the movable side lens unit 20. That is, the imaging optical system that collects photographic subject light to an image sensor, includes various lenses etc. in the fixed side lens unit 10 and various lenses etc. in the movable side lens unit 20.

Figure 2:
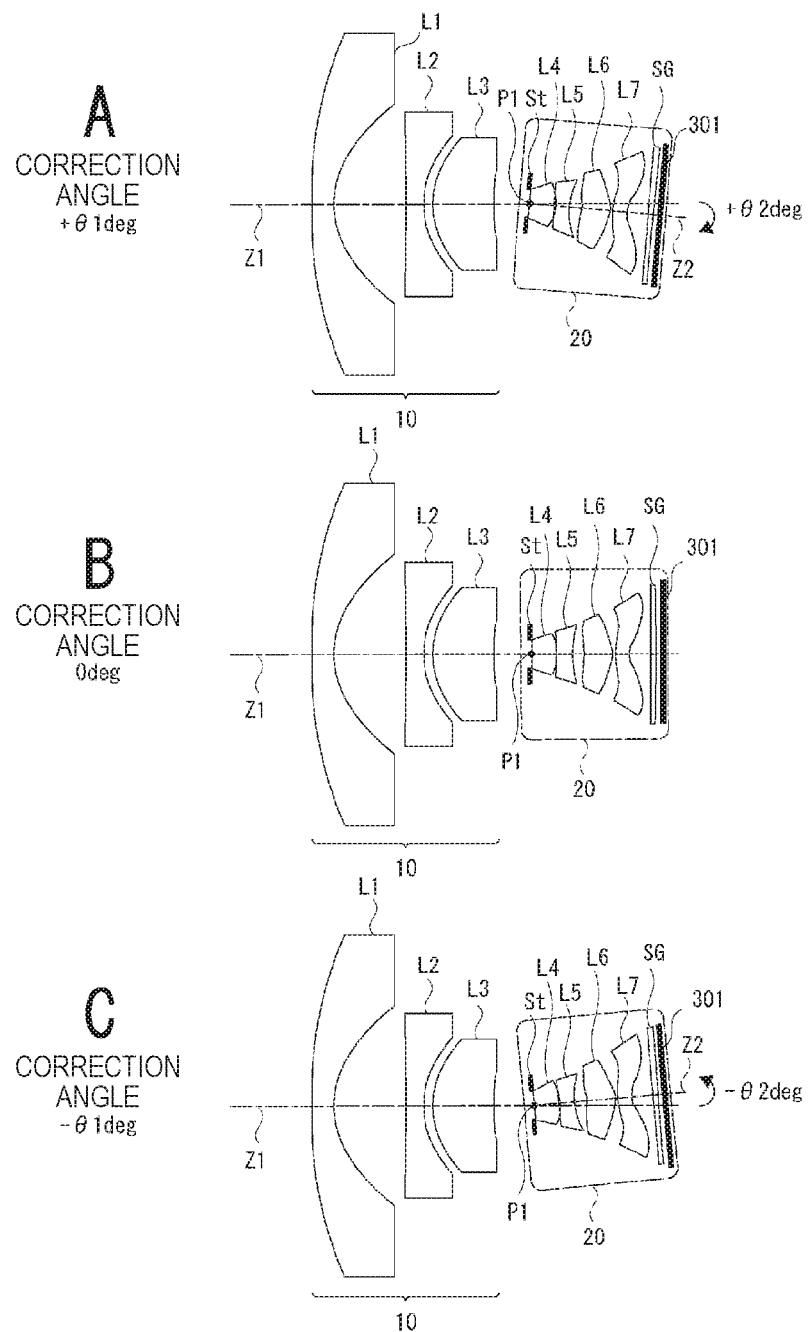
FIG. 2 is an explanatory illustration of a lens group of a lens unit in an embodiment of the present technology.

An example of a constitution of the imaging optical system is shown in FIG. 2B. In an example in here, the fixed side lens unit 10 is made a wide angle lens. The fixed side lens unit 10 includes, in the order from an object side, for example, a first lens L1 that has a negative refractive power and a meniscus shape with a convex surface facing the object side, a second lens L2 having a negative refractive power, and a third lens L3 having a positive refractive power. By adopting this constitution, it becomes possible to realize a wide angle lens with the focal length of the lens whole system being short.

The movable side lens unit 20 includes, in the order from the object side, for example, a fourth lens L4 having a positive refractive power, a fifth lens L5 having a negative refractive power, a sixth lens L6 having a positive refractive power, and a seventh lens L7 that has a negative refractive power in the vicinity of an optical axis and an image side lens surface with a concave shape on the image side in the vicinity of the optical axis and a convex shape on the image side at a peripheral portion.

In the case of adopting this constitution, it becomes possible to shorten an overall length while correcting aberration occurring in the movable side lens unit 20 with good balance, whereby it becomes advantageous to miniaturize the imaging device 1.

Moreover, in the movable side lens unit 20, an image sensor 301 arranged at an image surface and a seal glass SG for protecting the image sensor are disposed. Moreover, an aperture diaphragm St is disposed in the vicinity of a lens surface (the fourth lens L4) on the most object side of the movable side lens unit 20.

Of course, in addition to those shown in the illustration, optical members such as various kinds of optical filters may be disposed.

For example, in the imaging device 1 of the present embodiment including such a fixed side lens unit 10 and a movable side lens unit 20, the movable side lens unit 20 is made rotatable in a pitching direction and a yawing direction in order to perform correction of image shake in a casing 1A of the imaging device 1.

The fixed side lens unit 10 is fixedly attached in the casing 1A of the imaging device 1 so as to be arranged on a photographic subject side (=object side) in front of the movable side lens unit 20. In this connection, the fixed side lens unit 10 may be detachable from the casing 1A of the imaging device 1.

FIG. 1A shows a state where rotation is not applied to the casing 1A of the imaging device 1, and FIG. 1B show a state where rotation of an angle of $\theta 1$ has been applied to the casing 1A of the imaging device 1 due to hand shake or the like.

In order to cancel image shake due to such rotation, the movable side lens unit 20 is driven. For example, the movable side lens unit 20 is driven so as to rotate by an angle of $\theta 2$ within the casing 1A.

FIG. 2A and FIG. 2C show a state where the movable side lens unit 20 is driven so as to rotate by an angle of $\theta 2$.

FIG. 2B corresponds to the state of FIG. 1A where rotation is not applied. The optical axis Z1 of the fixed side lens unit 10 and the optical axis Z2 of the movable side lens unit 20 are coincident with each other.

In the case where rotation has been applied to the casing 1A, the imaging device 1 drives and rotates the movable side lens unit 20 so as to make the movable side lens unit 20 incline relative to the optical axis Z1 of the fixed side lens unit 10, thereby performing the shake correction of a captured image. FIG. 2A shows a state where the movable side lens unit 20 has been rotated by an angle of $+\theta 2$ in response to the rotation of an angle of $+\theta 1$ having been applied to the casing 1A of the imaging device 1. FIG. 2C shows a state where the movable side lens unit 20 has been rotated by an angle of $-\theta 2$ in response to the rotation of an angle of $-\theta 1$ having been applied to the casing 1A of the imaging device 1.

In this connection, although only the rotation in one of the yawing direction and the pitching direction is expressed in the illustration, actually, the driving of the movable side lens unit 20 is performed with respect to both of these directions.

The relationship between an angle of $\theta 1$ (that is, a swing angle as shake of a device) of the rotation applied to the casing 1A of the imaging device 1 and an angle of $\theta 2$ as an amount of correction by which the movable side lens unit 20 is driven, becomes different correspondingly to a field angle depending on an optical system constitution.

Now, assuming a constitution that the fixed side lens unit 10 has a role of a wide conversion lens and the movable side lens unit 20 has a role of a main line optical system, as the magnification of the fixed side lens unit 10 becomes smaller, the field angle becomes a wider angle, and a ratio of an angle of $\theta 1$ and an angle of $\theta 2$ becomes larger.

On the contrary, in the case of considering that the magnification of the fixed side lens unit 10 is one time (=a state where it does not play a role of a wide conversion lens), the field angle of the wide conversion lens becomes the same as the field angle of the main line optical system. In this case, it becomes an angle of $\theta 1$=an angle of $\theta 2$.

For example, in the case where the magnification of the fixed side lens unit 10 is 0.5, it becomes $\theta 1:\theta 2=2:1$.

In this connection, the above is one example, and the correction angle of the movable side lens unit 20 may fluctuate depending on various kinds of optical balance designs and the like.

Here, for the purpose of comparison, FIG. 1C and FIG. 1D show an example of an imaging device 100 that mounts a unit 101 including the whole imaging optical system and drives and rotates for shake correction. In the unit 101, various lenses, an optical filter, an image sensor, etc. are mounted. In this case, for the rotation (angle of $\theta 1$) having been applied to the casing 100A of the imaging device 100, the whole unit 101 is driven, thereby correcting image shake.

As compared with such a mechanism, in the case of the imaging device 1 in the present embodiment in FIG. 1A and FIG. 1B, the constituent elements of the imaging optical system is mounted by being divided into the fixed side lens unit 10 and the movable side lens unit 20, and is configured to drive only the movable side lens unit 20.

In the movable side lens unit 20, all of the optical system constituting components are not mounted, and it is not necessary to mount comparatively large size lenses, for example, such as a lens for a wide angle. Accordingly, it is possible to aim to make a movable portion smaller and lighter.

With this, in the imaging device 1, the miniaturization of a driving mechanism can be realized, and, further, it becomes advantageous for the miniaturization of the imaging device 1.

Moreover, by making the movable part (movable side lens unit 20) smaller and lighter, it is also possible to reduce driving electric power, and it is possible to promote low power consumption.

Moreover, in the case of the imaging device 100 in FIG. 1C and FIG. 1D, since the whole imaging optical system as the unit 101 is made the movable part, an end portion, on the object side, of the unit 101 cannot be fixed to the casing 100A of the imaging device 100. Accordingly, a clearance is caused in the casing 100A. For this reason, it becomes disadvantageous for dustproof and waterproofness.

On the contrary, the imaging device 1 in the embodiment in FIG. 1A and FIG. 1B, the fixed side lens unit 10 is fixedly attached in the casing 1A, thereby forming a sealed structure that does not cause a clearance in the casing 1A.

Therefore, it becomes possible to form a structure advantageous also in terms of dustproof and waterproofness.

From these matters, the imaging device 1 in the embodiment is suitable also as a wearable camera mounted especially on a human body and a small size camera etc. mounted on instruments, tools, vehicles, etc. in sports and other activities.

However, the imaging device 1 in the embodiment is required to detect not only the rotation applied to the casing 1A, but also the rotation having occurred in the movable side lens unit 20 within the casing 1A, and to perform driving of the above-mentioned angle of $\theta 2$ appropriately. Then, as shown in FIG. 1A and FIG. 1B, it is made to be equipped with a rotation detecting section 9 that detects rotation applied to the casing 1A of the imaging device 1 and a rotation detecting section 24 that detects rotation in the movable side lens unit 20. Moreover, as mentioned later, a shake correction driving signal is generated using detection information by the rotation detecting section 9 and detection information by the rotation detecting section 24, thereby driving the movable side lens unit 20.

Moreover, in the present embodiment, as shown in FIG. 2A, FIG. 2B, and FIG. 2C, a rotational movement center P1 at the time of rotationally moving the movable side lens unit 20 is made to be located at a point in the vicinity of a position where an aperture diaphragm St is arranged on an optical axis of the lens group of the fixed side lens unit 10. With this, the rotational movement center P1 becomes a point in the vicinity of an entrance pupil.

In this case, it is desirable to dispose also the aperture diaphragm St in the movable side lens unit 20, and to move rotationally together with the lens group of the lenses L4 through L7 and the image sensor 301 as one body.

By rotating the movable side lens unit 20 around the point as a rotation center in the vicinity of the entrance pupil of the imaging optical system, that is, by moving rotationally the lens group (L4 through L7) and the image sensor 301 of the movable side lens unit 20 as one body, it becomes possible to suppress unnecessary visual field fluctuation at the time of correcting blur or changing a visual field.

If the lens group (L4 through L7) and the image sensor 301 is moved rotationally as one body around a point as a rotation center different greatly from the position of the entrance pupil, a shift component occurs in a direction vertical to the optical axis Z1 in association with the rotational movement, and then, due to this, visual field fluctuation occurs.

It is also possible to correct the occurred visual field fluctuation by image processing calculation at a latter stage (for example, processing in a below-mentioned image processing section 4). However, in order to simplify correction by the image processing calculation and to secure the amount of blur correction and the amount of change in the visual field in the rotational movement as much as possible, it is desirable to move rotationally the lens group (L4 through L7) and the image sensor 301 as one body around a point as a rotation center in the vicinity of the optical axis where the aperture diaphragm St is disposed, so as not to cause such a shift component.

Moreover, it is desirable that the aperture diaphragm St is disposed between the fixed side lens unit 10 and the movable side lens unit 20, in particular, in the vicinity of a lens surface of the lens L4 on the most object side of the movable side lens unit 20. With this, it becomes possible to dispose the entrance pupil of the imaging optical system closer to the object side. As a result, it becomes possible to suppress the outer diameter size of a lens constituting the lens group (L1 through L3) of the fixed side lens unit 10, whereby the miniaturization of the whole imaging device 1 can be attained.

2. Structural Example of Movable Side Lens Unit

The structural example of the movable side lens unit 20 in the imaging device 1 in the embodiment is described. In this connection, various kinds of structures of the movable side lens unit 20 supported rotatably in a yawing direction and a pitching direction within the casing 1A may be considered. Accordingly, the structural example described in the below is one example of them.

Figure 3:
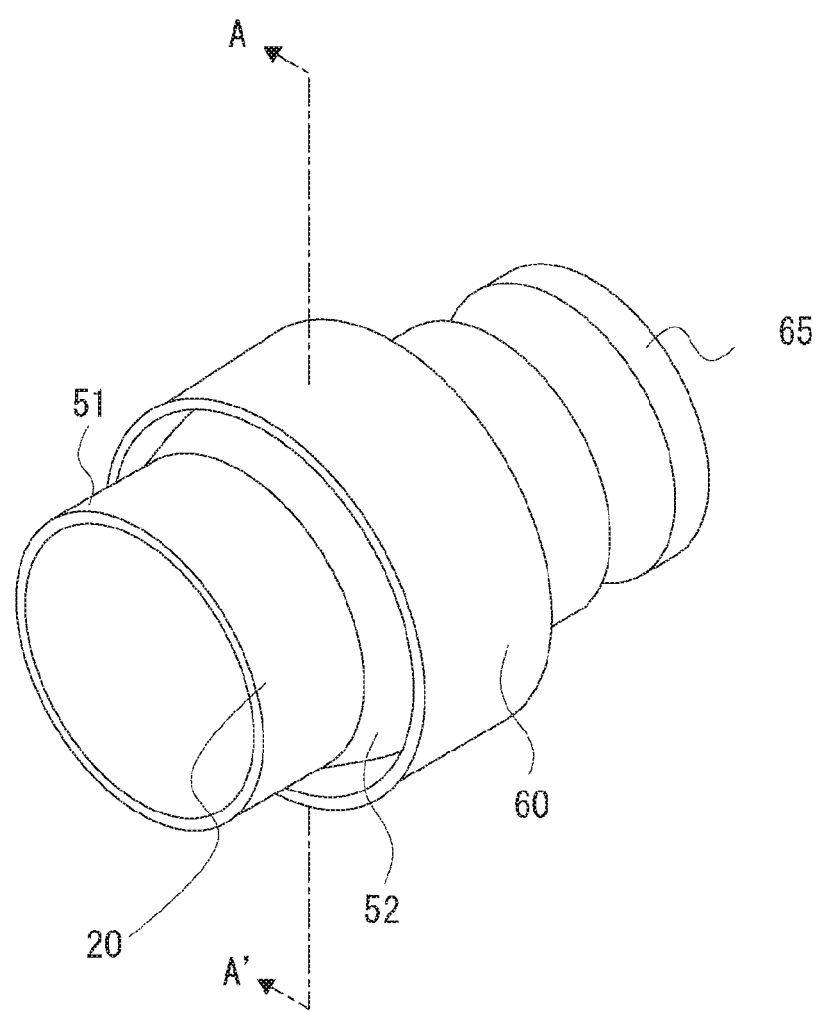
FIG. 3 is a perspective view of a movable side lens unit in an embodiment.

FIG. 3 is a perspective view showing a mechanism for correcting image shake. Here, the movable side lens unit 20, a unit holding section 60 that supports the movable side lens unit 20, and a driving section 65 are shown.

The unit holding section 60 holds the movable side lens unit 20 in a state of having supported it rotatably in the yawing direction and the pitching direction.

The driving section 65 rotates the movable side lens unit 20 in the yawing direction and the pitching direction on the basis of a shake correction driving signal from a later-mentioned shake correction calculating section 3, thereby correcting image shake of a captured image caused by shake applied to the movable side lens unit 20.

Figure 4:
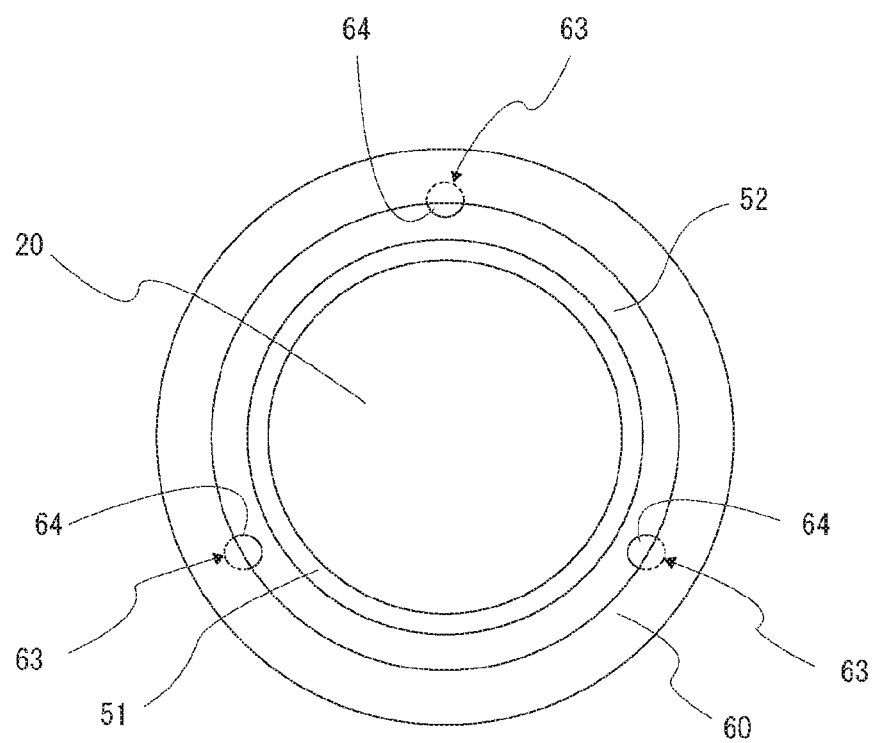
FIG. 4 is a front view of a movable side lens unit in an embodiment.
Figure 5:
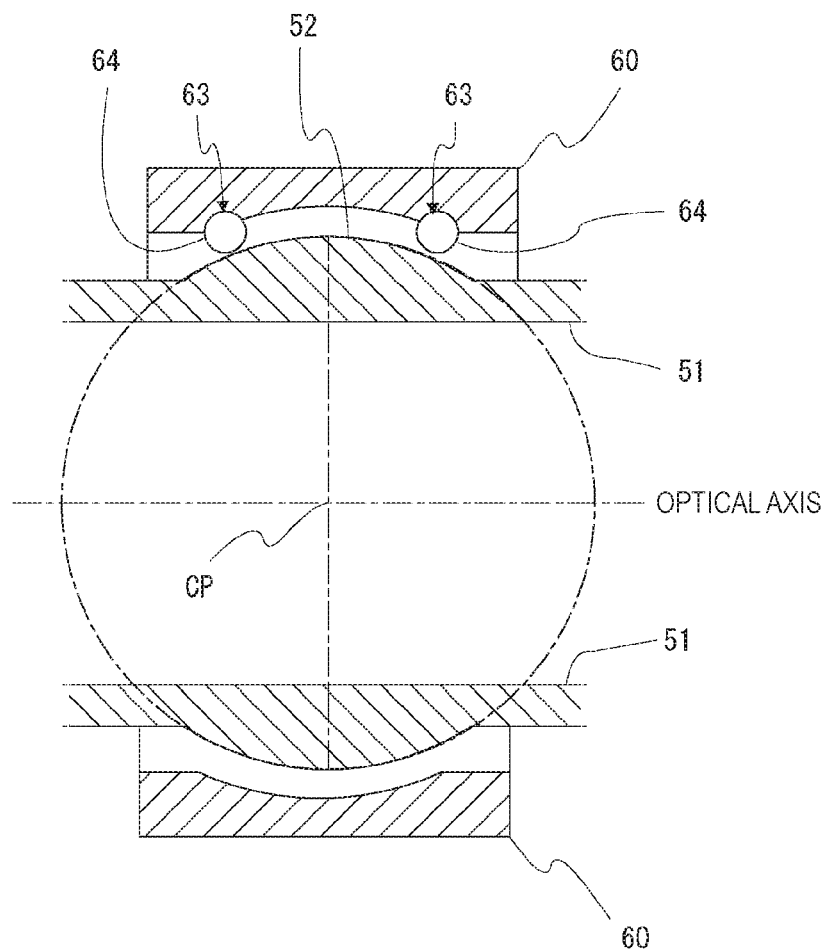
FIG. 5 is a schematic cross sectional view of a unit holding section in an embodiment.

FIG. 4 is a front view of the movable side lens unit 20 being held by the unit holding section 60, and FIG. 5 is a schematic cross sectional view (A-A' cross section in FIG. 3) of the unit holding section 60.

On a lens barrel 51 of the movable side lens unit 20, a convex surface being a part of a spherical surface making a predetermined position on the optical axis of an imaging lens a center position CP is formed as a rolling surface 52 in a belt shape in the circumferential direction on the surface of the lens barrel 51.

In the unit holding section 60, a ball holding section 63 is formed on a surface opposite to the rolling surface 52 formed on the lens barrel 51, and a ball 64 is held by the ball holding section 63 so as to be able to roll on the rolling surface 52. A plurality of ball holding sections 63 is formed so as to sandwich a parietal portion of the rolling surface 52. For example, in FIG. 5, two ball holding sections 63 are formed so as to sandwich the parietal portion of the rolling surface 52. Furthermore, a plurality of ball holding sections 63 are formed in the circumferential direction of the lens barrel 51 relative to the unit holding section 60 such that the position of the lens barrel 51 does not move in a radial direction. For example, as shown in FIG. 4, the ball holding sections 63 are disposed such that an interval between them becomes 120 degrees.

Figure 7:
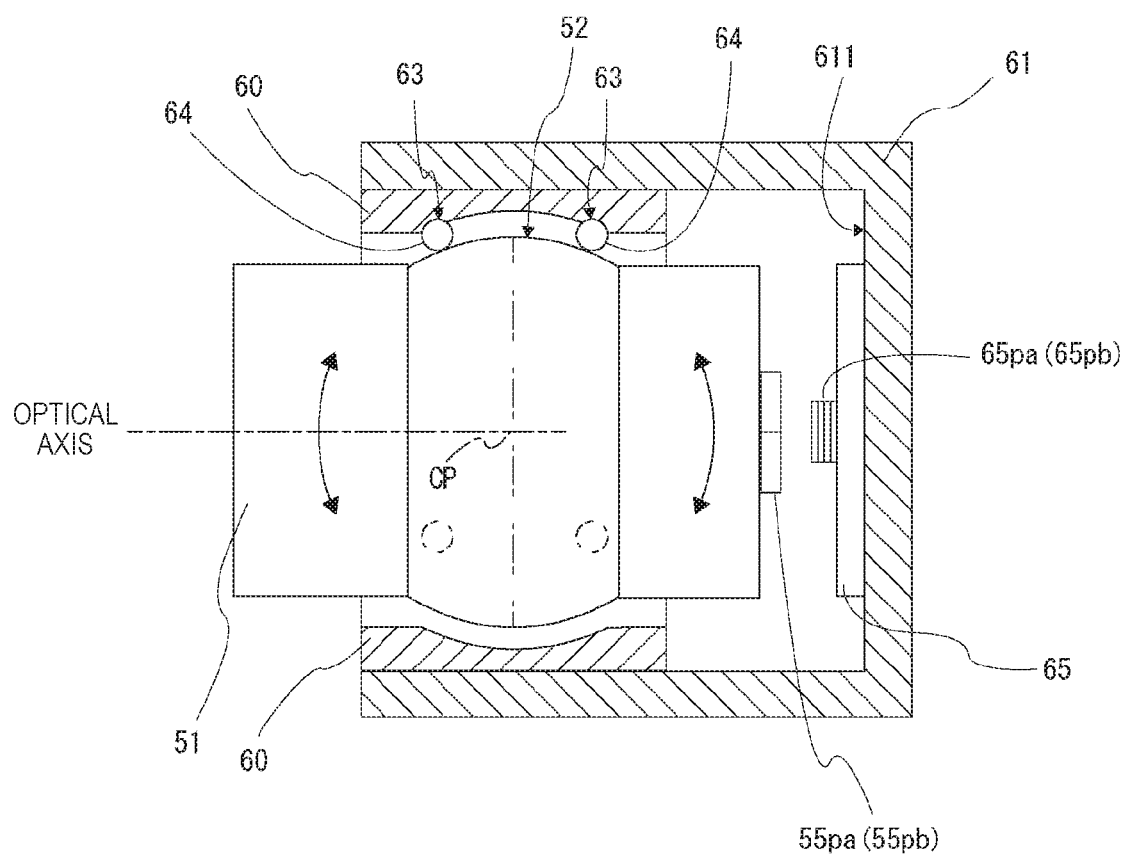
FIG. 7 is an explanatory illustration of an operation of a driving section in an embodiment.

Therefore, the movable side lens unit 20 is made rotatable in the yawing direction and the pitching direction relative to the center position CP of the rolling surface 52 as a reference position in a state of being held by the unit holding section 60. In this connection, the unit holding section 60 is formed, for example, in a driving casing 61 as shown in FIG. 7.

Figure 6:
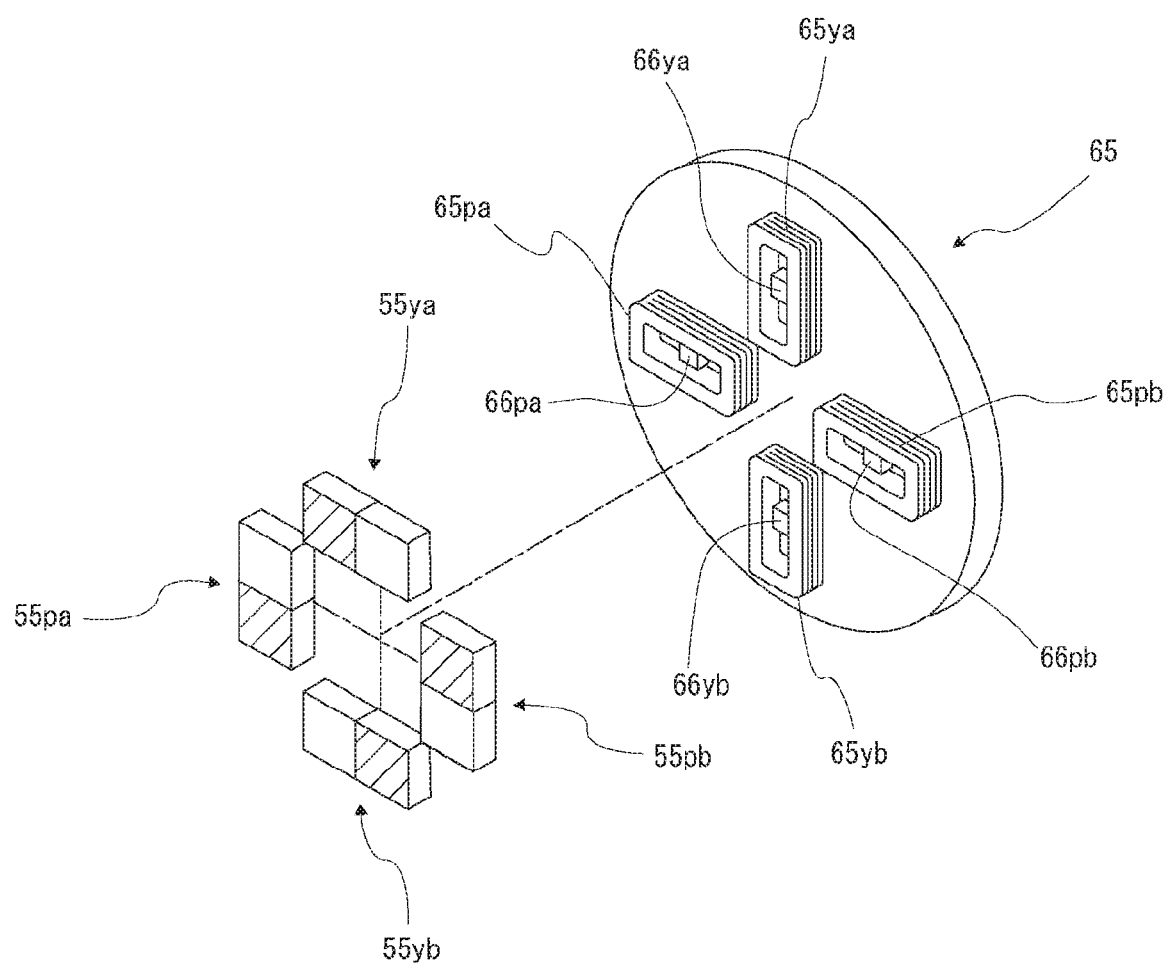
FIG. 6 is a perspective view of a driving section in an embodiment.

FIG. 6 is a perspective view showing a constitution of the driving section 65 that moves rotationally the movable side lens unit 20 in the yawing direction and the pitching direction. As shown in FIG. 7, the driving section 65 is disposed on a surface 611 opposite to the rear end surface of the movable side lens unit 20 in the driving casing 61.

As shown in FIG. 6, the driving section 65 includes driving coils 65$ya$ and 65$yb$ that rotate the movable side lens unit 20 in the yawing direction and driving coils 65$pa$ and 65$pb$ that rotate the movable side lens unit 20 in the pitching direction.

Moreover, on the rear end surface of the movable side lens unit 20, a magnet 55$ya$ is disposed at a position corresponding to the driving coil 65$ya$. Similarly, magnets 55$yb$, 55$pa$, and 55$pb$ are disposed at positions corresponding to the driving coils 65$yb$, 65$pa$, and 65$pb$, respectively.

In the magnet 55$ya$, a magnet in which a magnetic pole of its surface facing the driving coil 65$ya$ is an S pole and a magnet in which a magnetic pole of such a surface is a N pole, are aligned in the horizontal direction. In this connection, in FIG. 6, a magnet in which a magnetic pole of its surface facing a driving coil is an S pole, is indicated with oblique lines. In the magnet 55$yb$, a magnet in which a magnetic pole of its surface facing the driving coil 65$yb$ is an S pole and a magnet in which a magnetic pole of such a surface is a N pole, are aligned in the horizontal direction.

In the magnet 55$pa$, a magnet in which a magnetic pole of its surface facing the driving coil 65$pa$ is an S pole and a magnet in which a magnetic pole of such a surface is a N pole, are aligned in the vertical direction. In the magnet 55$pb$, a magnet in which a magnetic pole of its surface facing the driving coil 65$pb$ is an S pole and a magnet in which a magnetic pole of such a surface is a N pole, are aligned in the vertical direction.

In a state where the movable side lens unit 20 is located at a central position (central position within a rotation range), the magnet 55ya (55yb) and the driving coil 65ya (65yb) are arranged such that a central position between the two magnets aligned in the horizontal direction in the magnet 55ya (55yb) is located at a central position of the driving coil 65ya (65yb).

Similarly, in a state where the movable side lens unit 20 is located at a central position, the magnet 55pa (55pb) and the driving coil 65pa (65pb) are arranged such that a central position between the two magnets aligned in the vertical direction in the magnet 55pa (55pb) is located at a central position of the driving coil 65pa (65pb).

In this connection, FIG. 6 shows an example where, at the insides of the driving coil 65ya (65yb) and 65pa (65pb), there are provided hall elements 66ya (66yb) and 66pa (66pb) for discriminating the rotation position of the movable side lens unit 20 by detecting magnetic fields caused by the magnet 55ya (55yb) and 55pa (55pb). The hall elements 66ya (66yb) and 66pa (66pb) detect the rotation position (angle) of the movable side lens unit 20 as the rotation detecting section 24.

An example where the hall elements 66ya (66yb) and 66pa (66pb) are provided in such a way, corresponds to the later-mentioned second embodiment. In the first embodiment, description is given for an example where the rotation detecting section 24 is made an angular velocity sensor and is attached to the movable side lens unit 20, and in this case, it is not necessary to dispose the hall elements as shown in FIG. 6.

With reference to FIG. 7, the operation of the driving section 65 is described. In this connection, FIG. 7 exemplifies a rotational action in the pitching direction (arrow direction in the illustration), and shows the magnet 55pa (55pb) and the driving coil 65pa (65pb). In consideration of the easy comprehension in the illustration, the illustration of the magnet 55ya (55yb) and the driving coil 65ya (65yb) is omitted.

As mentioned in the above, since the balls 64 are provided between the rolling surface 52 and the ball holding sections 63 of the unit holding section 60, the movable side lens unit 20 is held rotatably by making the center position CP of the rolling surface 52 a rotation fulcrum.

Moreover, in a state where the movable side lens unit 20 is made to be located at the central position (central position in a rotatable range), the central position between the two magnets aligned in the vertical direction in the magnet 55pa (55pb) is arranged to be located at the central position of the driving coil 65pa (65pb).

Here, upon supplying an electric current to the driving coil 65pa (65pb), a magnetic field is generated correspondingly to the supplied electric current, and then, the magnet 55pa (55pb) is moved in the vertical direction by the generated magnetic field. That is, in response to shake applied, in the pitching direction, to the movable side lens unit 20, an electric current is supplied to the driving coil 65pa (65pb) so as to rotate the movable side lens unit 20, whereby image shake in the pitching direction can be corrected.

Moreover, although not illustrated, in response to shake applied, in the yawing direction, to the movable side lens unit 20, an electric current is supplied to the driving coil 65ya (65yb) so as to rotate the movable side lens unit 20, whereby image shake in the yawing direction can be corrected.

In this way, image shake is corrected by rotating the movable side lens unit 20 by the driving section 65.

In this connection, the constitution that rotates the movable side lens unit 20 in the yawing direction and the pitching direction should be not restricted to the constitution shown in FIG. 3 through FIG. 7. For example, the following constitution may be used.

A first rotating shaft is disposed in the vertical direction (horizontal direction) relative to a movable side lens unit, and the first rotating shaft is held by an inner frame so as to be rotatable. Moreover, the first rotating shaft is made to rotate in the yawing direction (pitching direction) by a motor and the like. Furthermore, a second rotating shaft is disposed in the horizontal direction (vertical direction) relative to the inner frame, and the second rotating shaft is held with an external frame so as to be rotatable. Moreover, the second rotating shaft is made to rotate in the pitching direction (yawing direction) by a motor and the like.

Thus, even with the constitution that the movable side lens unit 20 is supported so as to be rotatable by the first rotating shaft and the second rotating shaft and each of the first rotating shaft and the second rotating shaft id made to rotate by the motor, it is possible to perform the driving for correcting image shake.

3. Constitution of Imaging Device in First Embodiment

The constitution of the imaging device 1 as the first embodiment is described with reference to FIG. 8 and FIG. 9. In this connection, for example, as in the above-mentioned structural example, the imaging device 1 includes the fixed side lens unit 10 and the movable side lens unit 20, and the movable side lens unit 20 is supported rotatably in the yawing direction and the pitching direction within the casing 1A.

Figure 8:
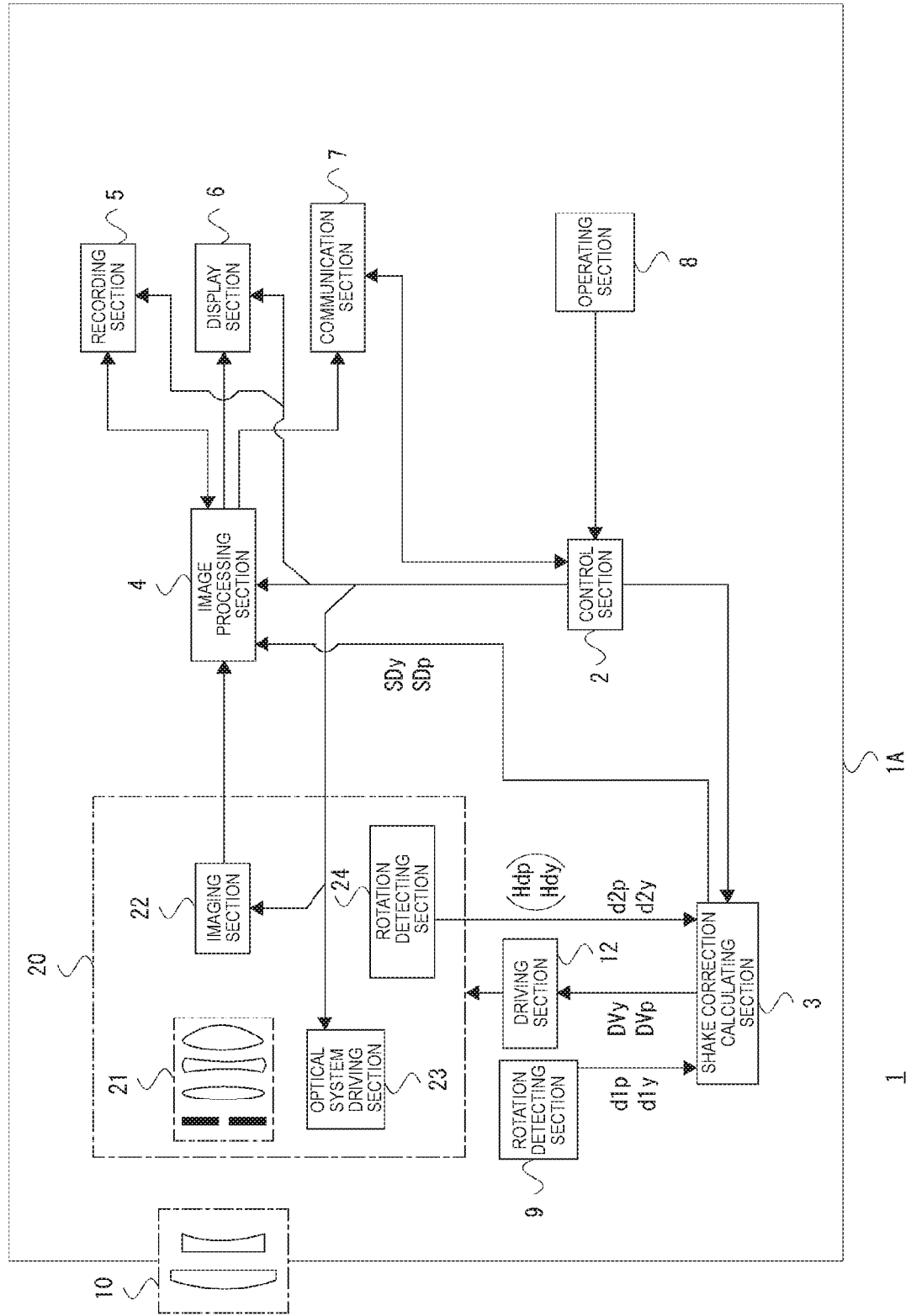
FIG. 8 is a block diagram of an imaging device in an embodiment.

FIG. 8 is a block diagram of a constitution of the imaging device 1 in the first embodiment. The imaging device 1 includes the fixed side lens unit 10, the movable side lens unit 20, a control section 2, a shake correction calculating section 3, an image processing section 4, a recording section 5, a display section 6, a communication section 7, an operating section 8, a rotation detecting section 9, and a driving section 12.

The fixed side lens unit 10 is fixed to the casing 1A of the imaging device 1. In the case of supposing lens exchange and the like, it may be constituted to be detachable. The term "fixed" used in here means that it is not one made rotatable like the movable side lens unit 20 within the casing 1A of the imaging device 1.

On the fixed side lens unit 10, optical components constituting a part of the imaging optical system are mounted. For example, it may be an optical system for wide angle imaging such as the lenses L1 through L3 as having described in FIG. 2B, or may be a fish-eye lens, a zoom lens, or the other optical systems.

On the movable side lens unit 20, the movable side optical system 21, the imaging section 22, the optical system driving section 23, and the rotation detecting section 24 are mounted.

On the movable side optical system 21, optical components forming the imaging optical system together with the lenses in the fixed side lens unit 10, are mounted. For example, as exemplified in FIG. 2B, one or a plurality of lenses, the optical filter, the aperture diaphragm, and so on are disposed.

The imaging section 22 includes an image sensor, a preprocessing section, an imaging driving section, and so on.

Light from the object side enters from the fixed side lens unit 10 to the movable side optical system 21, and an optical image is formed on an imaging surface of an image sensor by the movable side optical system 21. The image sensor performs a photoelectric conversion process and converts an optical image formed on the imaging surface into electric signals.

As this image sensor, for example, a CCD (Charge Coupled Device) image sensor, a CMOS (Complementary Metal-Oxide Semiconductor) image sensor, or the like is used.

The preprocessing section performs a noise removing process, such as CDS (correlated double sampling: correlation double sampling), to the electric signals generated by the image sensor. Moreover, the preprocessing section performs gain adjustment to make the signal level of electric signals a desired signal level. Furthermore, the preprocessing section performed an A/D conversion process so as to convert the analog image signals being the electric signals having been subjected to the noise removing process and the gain adjustment to digital image signals, and outputs the digital image signals to the image processing section 4.

The imaging driving section performs generation of operation pulses and the like necessary for driving the image sensor on the basis of control signals from the control section 2. For example, it performs generation of electric charge read-out pulses for reading out electric charges, transfer pulses for performing transfer in the vertical direction and the horizontal direction, shutter pulses for performing operation for an electronic shutter, and so on.

The optical system driving section 23 performs driving of the optical components of the movable side optical system 21 on the basis of the control signals from the control section 2. For example, it performs focus adjustment by moving a focus lens in the optical axis direction. Moreover, in the case where a zoom lens is mounted, the optical system driving section 23 makes a focal length changeable by moving the zoom lens in the optical axis direction. Furthermore, in the case where a mechanical diaphragm mechanism is mounted, the optical system driving section 23 performs the driving of it.

As having described in FIG. 1A and FIG. 1B, the rotation detecting section 24 is mounted in the movable side lens unit 20, and detects rotation having been caused in the movable side lens unit 20 in the casing 1A.

In concrete terms, a biaxial gyro sensor (angular velocity sensor) is used for the rotation detecting section 24. With this, the rotation detecting section 24 generates detection information d2$y$ of an angular velocity corresponding to rotation in the yawing direction and detection information d2$p$ of an angular velocity corresponding to rotation in the pitching direction, and supplies them to the shake correction calculating section 3.

On the basis of the shake correction driving signal supplied from the shake correction calculating section 3, the driving section 12 drives rotationally the movable side lens unit 20 in which the movable side optical system 21, the imaging section 22, the optical system driving section 23, and the rotation detecting section 24 are mounted as mentioned in the above. In concrete terms, on the basis of the shake correction driving signal DVy from the shake correction calculating section 3, it rotates the movable side lens unit 20 in the yawing direction, and on the basis of the shake correction driving signal DVp, it rotates the movable side lens unit 20 in the pitching direction.

The driving section 65 shown in FIG. 6 is one example of a concrete constitution of the driving section 12 in FIG. 8. In this case, an electric current supplied to the driving coil 65$pa$ (65$pb$) corresponds to the shake correction driving signal DVp, and an electric current supplied to the driving coil 65$ya$ (65$yb$) corresponds to the shake correction driving signal DVy.

The rotation detecting section 9 is mounted in the casing 1A of the imaging device 1 as having described in FIG. 1A and FIG. 1B, and detects rotation applied to the casing 1A.

In concrete terms, a biaxial gyro sensor (angular velocity sensor) is used for the rotation detecting section 9. With this, the rotation detecting section 24 generates detection information d1$y$ of an angular velocity corresponding to rotation in the yawing direction and detection information d1$p$ of an angular velocity corresponding to rotation in the pitching direction, and supplies them to the shake correction calculating section 3.

The image processing section 4 performs camera process processing etc. for image signals as digital data output from the imaging section 22.

The image processing section 4 performs, for example, nonlinear processing such as gamma correction, knee correction, dynamic distortion correction, color correction processing, edge enhancement processing, resolution conversion processing, codec processing, and the like for image signals. The image processing section 4 outputs the image signals after the processing to the display section 6, the recording section 5, and the communication section 7.

In this connection, in the image processing section 4, correction for image shake due to image processing may be also performed together.

The recording section 5 records the image signals output from the image processing section 4 in a recording medium. The recording medium may be detachable like a memory card, an optical disc, and a magnetic tape, or may be a fixed type HDD (Hard Disk Drive), semiconductor memory module, or the like.

Moreover, an encoder and a decoder may be disposed in the recording section 5 so as to perform compression encoding and extension decryption of image signals, and coded signals may be recorded in the recording medium.

The display section 6 constitutes a display panel or an electronic view finder, and performs the display of a camera through image, and the like on the basis of the image signals output from the image processing section 4.

Moreover, the display section 6 performs a menu display, operation status display, and the like for performing operation setting of the imaging device 1.

Moreover, in the case of having read out the image signals or coded signals recorded in the recording medium in the recording section 5, the display section 6 may display a reproduced image of them.

In this connection, in the case where the number of display pixels is less than a captured image, the display section 6 performs a process to convert the captured image into a display image of the number of display images.

The communication section 7 performs wired or wireless communication between itself and external devices not illustrated. For example, it performs transmission and reception of image signals or control data. With this, the imaging device 1 can perform transmission of image signals or control data to the not-illustrated external devices, can acquire image signals supplied from the external devices, and can perform a process of recording, displaying, and the like.

It can be considered that the communication section 7 performs communication, for example, by communication methods, such as wireless communication standards, such as WIFI (Wireless Fidelity) and bluetooth.

Moreover, the communication section 7 performs communication, for example, by various kinds of networks, such as the Internet, a home network, and LAN (Local Area Network), as a network communication section, and may be made to perform transmission and reception of various kinds of data between itself and a server, a terminal, etc. on the network.

The operating section 8 has an inputting function to inputs a user's operation, and sends signals corresponding to the operation having been input to the control section 2.

This operating section 8, is realized, for example, as various operation tools and touch pads disposed on the casing 1A of the imaging device 1 and a touch panel formed on the display section 6.

As the operation tools on the casing 1A, considered are a reproduction menu start button, a decision button, a cross key, a cancel button, a zoom key, a sliding key, a shutter button (release button), a focus ring, and so on.

Moreover, by a touch panel operation using an icon, a menu, etc. displayed on a touch panel and the display section 6, various kinds of operations may be made possible.

Alternatively, there is also a mode of detecting a user's tap operation by a touchpad and so on.

The control section 2 includes a microcomputer (arithmetic processing unit) equipped with a CPU (Central Processing Unit), a ROM (Read Only Memory), a RAM (Random Access Memory), a flash memory, and so on.

The CPU totally controls the whole imaging device 1 by executing programs memorized in the ROM, the flash memory, or the like.

The RAM is used for temporarily storing data, a program, etc. as a working region at the time of performing various kinds of data processing by the CPU.

The ROM and the flash memory (nonvolatile memory) are used for memorizing an OS (Operating System) on the basis of which the CPU controls each section, and contents files, such as image files, and, in addition, for memorizing application program for various operations, firmware, and so on. In the present example, in particular, a program for executing a process for state detection and mode control corresponding to it, is also memorized.

Such a control section 2 controls respective sections necessary for instructions for various signal processing in the image processing section 4, imaging operation or recording operation corresponding to a user's operation, reproducing operation for recorded image file, camera operation, such as zoom, focus, and exposure adjustment, correction operation of image shake, user interface operation, and so on.

The shake correction calculating section 3 generates shake correction driving signals DVy and DVp for the driving section 12 by using the detection information d1y and d1p by the rotation detecting section 9 and the detection information d2y and d2p by the rotation detecting section 24. Namely, the shake correction calculating section 3 generates the shake correction driving signals DVy and DVp for rotating the movable side lens unit 20 so as to reduce image shake caused in image signals when rotation has been applied to the imaging device 1.

Moreover, the shake correction calculating section 3 supplies distortion correction information SDy and SDp to the image processing section 4.

Figure 9:
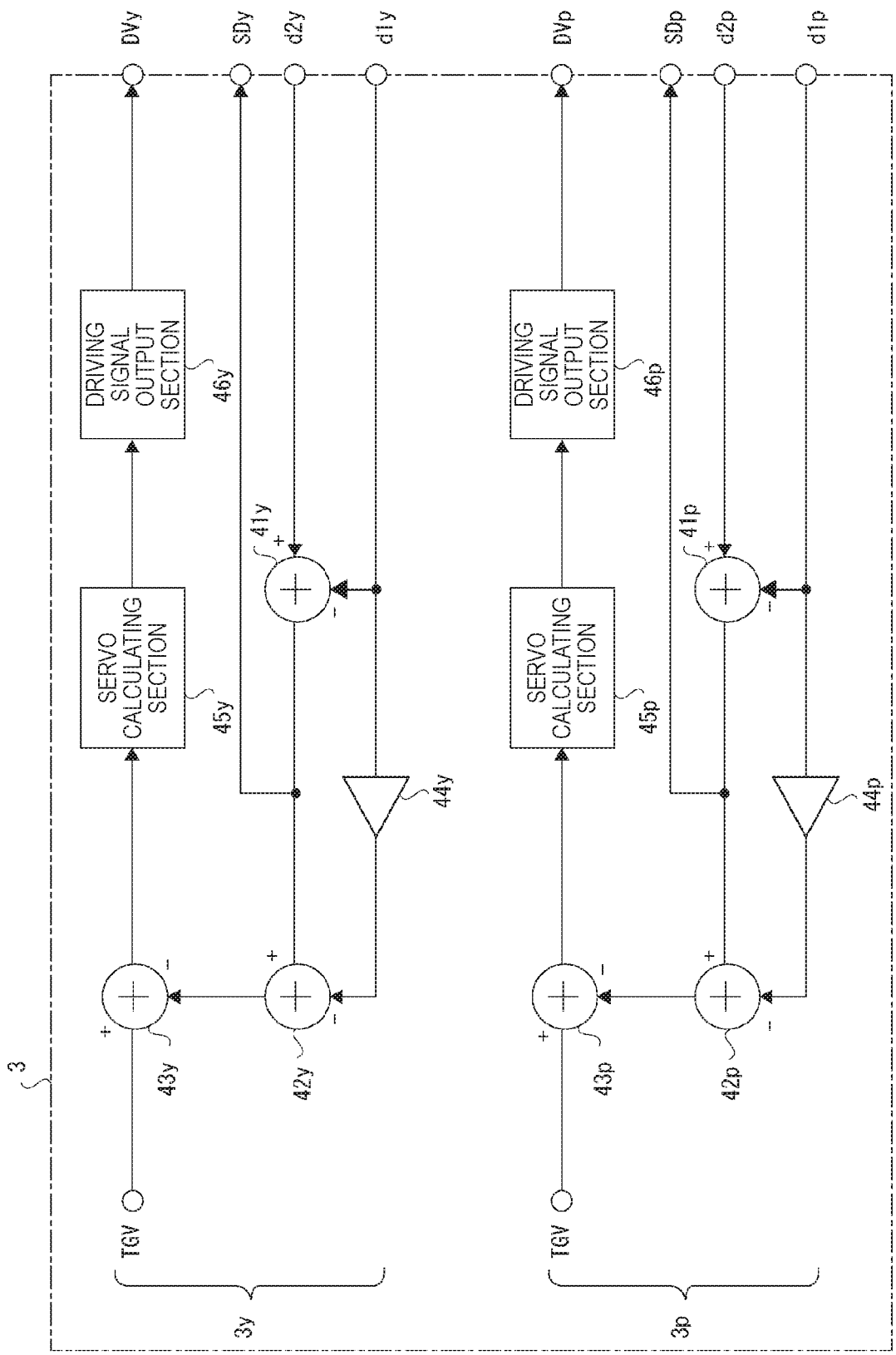
FIG. 9 is a block diagram of a shake correction calculating section in a first embodiment.

FIG. 9 shows a constitution example of the shake correction calculating section 3.

The shake correction calculating section 3 includes a first calculating section 3y corresponding to rotation in the yawing direction and a second calculating section 3p corresponding to rotation in the pitching direction.

The first calculating section 3y includes subtractors 41y, 42y, and 43y, a multiplier 44y, a servo calculating section 45y, and a driving signal output section 46y.

The second calculating section 3p includes subtractors 41p, 42p, and 43p, a multiplier 44p, a servo calculating section 45p, and a driving signal output section 46p.

That is, the first calculating section 3y and the second calculating section 3p have the same constitution, and are disposed so as to correspond to the yawing direction and the pitching direction, respectively.

The operation of the first calculating section 3y is described.

Into the subtractor 41y, the detection information (angular velocity) d1y from the rotation detecting section 9 and the detection information (angular velocity) d2y from the rotation detecting section 24 are input, and then, the subtractor 41y outputs a result of d2y−d1y.

Here, the detection information d1y is the angular velocity of the rotation in the yawing direction having been applied to the casing 1A of the imaging device 1, and the detection information d2y is the angular velocity of rotation in which the rotation in the yawing direction having been applied to the casing 1A and the rotation of the movable side lens unit 20 in the same direction are synthesized. Therefore, the output of the subtractor 41y becomes the angular velocity of the rotation of the movable side lens unit 20 in the yawing direction. This value is supplied to the subtractor 42y.

The multiplier 44y multiplies the value of the detection information d1y by a fixed coefficient. This coefficient is a value of a ratio of the angles of θ1 and θ2 shown in FIG. 1B. For example, in the case of θ1:θ2=2:1, the multiplier 44y multiply the value of the detection information d1y by "0.5" as the coefficient.

That is, the multiplier 44y performs the multiplication for obtaining the angle of θ2 as a correction angle in the yawing direction from the angle of θ1 of the rotation in the yawing direction having been applied to the casing 1A of the imaging device 1, and, in this case, it is to obtain the value of the angular velocity corresponding to the angle of θ2 as the correction angle.

The subtractor 42y subtracts the output of the multiplier 44y, i.e., the angular velocity corresponding to the angle of θ2 as a correction angle from the output of the subtractor 41y, i.e., the angular velocity of the rotation of the movable side lens unit 20. With this, a difference between the angular velocity of the rotation having actually occurred in the movable side lens unit 20 and the angular velocity corresponding to a correction angle, is obtained. The correction angle used in here is an angle by which the movable side lens unit 20 is to be rotated in the yawing direction.

The subtractor 43y subtracts the output of the subtractor 42y from a target value TGV. The target value TGV means a target angular velocity, and is specifically "0".

Therefore, the output of the subtractor 43y corresponds to the amount of driving for canceling a difference of the correction angle of the actual rotation angle of the movable side lens unit 20. In other words, it becomes the amount of an error for making the amount of the rotation of the movable side lens unit 20 the rotation (angle of θ2) of, for example, ½ of the rotation in the yawing direction having been applied to the casing 1A.

The output of the subtractor 43y is supplied to the servo calculating section 45y.

As described later in detail, the servo calculating section 45y performs a servo calculating operation, generates a control signal such that the amount of the error output from the subtractor 43y becomes "0", and outputs the control signal to the driving signal output section 46y.

The driving signal output section 46y generates a shake correction driving signal DVy on the basis of the control signal supplied from the servo calculating section 45y, and supplies it to the driving section 12, whereby the driving section 12 drives the movable side lens unit 20 such that the movable side lens unit 20 becomes the rotation (rotation in the yawing direction) of the angle of θ2 as an amount of correction.

The operations of the respective sections of the second calculating section 3p are substantially the similar.

In the case of the second calculating section 3p, into the subtractor 41p, the detection information (angular velocity) d1p from the rotation detecting section 9 and the detection information (angular velocity) d2p from the rotation detecting section 24 are input, and then, the subtractor 41p outputs a result of d2p−d1p.

The detection information d1p is the angular velocity of the rotation in the pitching direction having been applied to the casing 1A of the imaging device 1, and the detection information d2p is the angular velocity of rotation in which the rotation in the pitching direction having been applied to the casing 1A and the rotation of the movable side lens unit 20 in the same direction are synthesized. Therefore, the output of the subtractor 41p becomes the angular velocity of the rotation of the movable side lens unit 20 in the pitching direction. This value is supplied to the subtractor 42p.

The multiplier 44p multiplies the value of the detection information d1p by a fixed coefficient (for example, "0.5").

The subtractor 42p subtracts the output of the multiplier 44p, i.e., the angular velocity corresponding to the angle of θ2 as a correction angle from the output of the subtractor 41p, i.e., the angular velocity of the rotation of the movable side lens unit 20.

With this, a difference between the angular velocity of the rotation having actually occurred in the movable side lens unit 20 and the angular velocity corresponding to the correction angle, is obtained. The correction angle used in here is an angle by which the movable side lens unit 20 is to be rotated in the pitching direction.

The subtractor 43p subtracts the output of the subtractor 42p from a target value TGV (=0).

Therefore, the output of the subtractor 43p corresponds to the amount of driving for canceling a difference of the correction angle of the actual rotation angle of the movable side lens unit 20. In other words, it becomes the amount of an error for making the amount of the rotation of the movable side lens unit 20 in the pitching direction the rotation (angle of θ2) of, for example, ½ of the rotation in the pitching direction having been applied to the casing 1A.

The servo calculating section 45p performs a servo calculating operation, generates a control signal such that the amount of the error output from the subtractor 43p becomes "0", and outputs the control signal to the driving signal output section 46p.

The driving signal output section 46p generates a shake correction driving signal DVp on the basis of the control signal supplied from the servo calculating section 45p, and supplies the shake correction driving signal DVp to the driving section 12, whereby the driving section 12 drives the movable side lens unit 20 such that the movable side lens unit 20 becomes the rotation (rotation in the pitching direction) of the angle of θ2 as an amount of correction.

As mentioned in the above, the shake correction calculating section 3 performs feedback control using the detection information (d1y, d1p, d2y, d2p) from the rotation detecting sections 9 and 24, and enables the imaging section 22 to generate the image signals of a captured image in which image shake has been corrected.

The servo calculating sections 45y and 45p are described.

The servo calculating sections 45y and 45p perform, for example, feedback control by PID (Proportional-Integral-Differential) control in which proportional control (P control), integral control (I control section), and differential control (D control) are selectively combined.

In the PID control, the differential control (D control) is used in order to increase the stability of the feedback control by improving a reduction in a gain margin and a phase margin due to over control by the proportional control (P control).

The integral control (I control) is used in order to improve the offset characteristic of the feedback control. The PID control is performed by selecting and combining these proportional control, differential control, and integral control as required.

In the proportional control, the calculation of an equation (1) is performed so as to calculate a control output.

$$\text{Deviation} \times \text{proportional gain} = \text{proportional control output} \qquad (1)$$

In the differential control, the calculation of an equation (2) is performed so as to calculate a control output.

$$(\text{Deviation} - \text{the deviation at the time of the previous calculation}) \times \text{differential gain} = \text{differential control output} \qquad (2)$$

In the integral control, the calculation of an equation (3) is performed so as to calculate a control output.

$$(\text{Integral value of deviation} + \text{deviation}) \times \text{integral gain} = \text{integral control output} \qquad (3)$$

Figure 10:
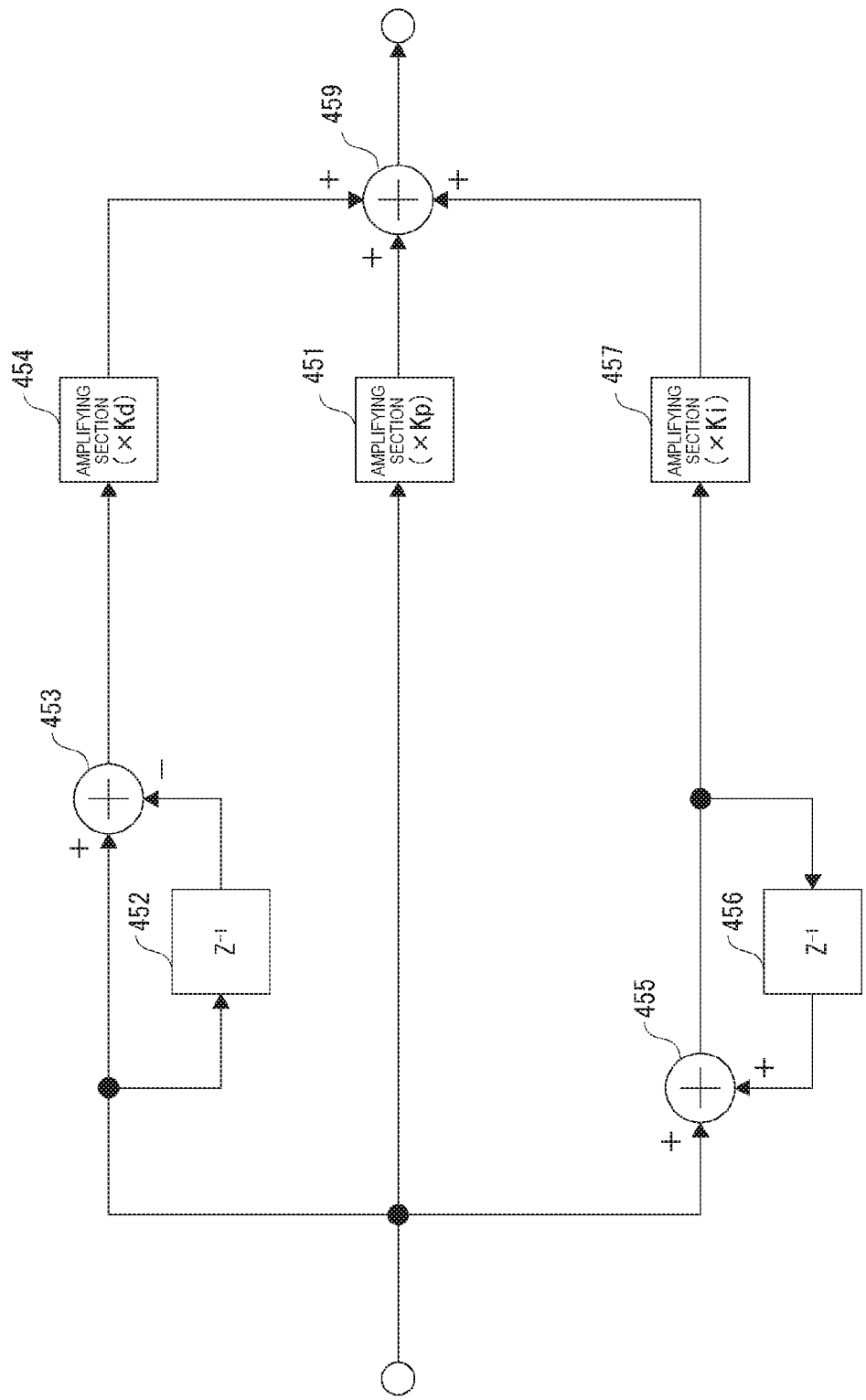
FIG. 10 is a block diagram of a servo calculating section in an embodiment.

FIG. 10 shows a constitution example of the servo calculating section 45y (or servo calculating section 45p).

The servo calculating section 45y (45p) includes amplifying sections 451, 454, and 457, delay sections 452 and 456, a subtractor 453, and adders 455 and 459.

The amplifying section 451 multiplies an error signal supplied from the subtractor 43y (43p) by a proportional gain Kp, and generates a proportional control signal being a proportional control output. The amplifying section 451 outputs the generated proportional control signal to the adder 459.

The delay sections 452 delays an error signal supplied from the subtractor 43y (43p) by one sampling period, and outputs the error signal to the subtractor 453.

The subtractor 453 performs a calculating process that subtracts the error signal output from the delay section 452 relative to the error signal supplied from the subtractor 43y (43p), generates a differential signal of an error, and outputs the differential signal to the amplifying section 454.

The amplifying section 454 multiplies the differential signal supplied from the subtractor 453 by the differential gain Kd, and generates a differential control signal being a differential control output. The amplifying section 454 outputs the generated differential control signal to the adder 459.

The adder 455 performs a process of adding the signal output from the delay section 456 to the error signal supplied from the subtractor 43y (43p), generates an integral signal of errors, and outputs the integral signal to the amplifying section 457.

The delay sections 456 delays the integral signal supplied from the adder 455 by one sampling period, and output the integral signal to the adder 455.

The amplifying section 457 multiplies the integral signal supplied from the adder 455 by the integral gain Ki, and generates the integral control signal being an integral control output. The amplifying section 457 outputs the generated integral control signal to the adder 459.

The adder 459 adds the proportional control signal supplied from the amplifying section 451, the differential control signal supplied from the amplifying section 454, and the integral control signal supplied from the amplifying section 457, and outputs the control signal after the adding to the driving signal output section 46y (46p).

The servo calculating sections 45y and 45p, for example, generate the control signal by the PID control with the above constitution.

In this connection, the control system should not be limited to the PID control, and the other control systems may be made to be used. For example, P (Proportional) control, PI (Proportional-Integral) control, PD (Proportional-Differential) control, and the like may be employed.

By the way, as shown in FIG. 8, the shake correction calculating section 3 supplies distortion correction information SDy and SDp to the image processing section 4.

As shown in FIG. 9, the shake correction calculating section 3 outputs the output of the subtractor 41y as the distortion correction information SDy, and outputs the output of the subtractor 41p as the distortion correction information SDp.

The output of the subtractor 41y is the angular velocity of the rotation of the movable side lens unit 20 in the yawing direction, and the output of the subtractor 41p is the angular velocity of the rotation of the movable side lens unit 20 in the pitching direction.

Depending on the constitution and design of the imaging optical system, dynamic distortion as shown schematically in FIG. 11 may occur in the image signals acquired by the imaging section 22 by rotating the movable side lens unit 20.

FIG. 11A shows an image having no distortion. In contrast, for example, in the case where there exists rotation (shake) in the pitching direction, an image is distorted as shown in FIG. 11B and FIG. 11C correspondingly to its rotation direction (+ direction/− direction of the pitching direction). Moreover, in the case where there exists rotation (shake) in the yawing direction, an image is distorted as shown in FIG. 11D and FIG. 11E correspondingly to its rotation direction (+ direction/− direction of the yawing direction). (In this connection, in the illustration, for description, the situation of image distortion is shown extremely)

In the case of correcting such distortion in the image processing section 4, the information regarding the rotation in the yawing direction and the information regarding the rotation in the pitching direction of the movable side lens unit 20 are needed.

Then, the shake correction calculating section 3 outputs the outputs of the subtractors 41y and 41p as the information (distortion correction information SDy) on the rotation in the yawing direction and the information (distortion correction information SDp) on the rotation in the pitching direction of the movable side lens unit 20 to the image processing section 4.

With this, the dynamic distortion correction can be appropriately executed in the image processing section 4.

For example, by disposing such a constitution, on the basis of information regarding the rotation, distortion correction matched with the shake correction may be performed.

4. Constitution of Imaging Device in Second Embodiment

The second embodiment is described. The second embodiment is an example where the rotation detecting section 24 is made as a position sensor using a hall element. For example, the rotation detecting section 24 includes hall elements 66ya (66yb) and 66pa (66pb) shown in FIG. 6. With this, the rotation detecting section 24 outputs the detection information Hdy on a rotational position (angle) in the yawing direction and the detection information Hdp on a rotational position (angle) in the pitching direction of the movable side lens unit 20 to the shake correction calculating section 3 (refer to FIG. 8).

Figure 12:
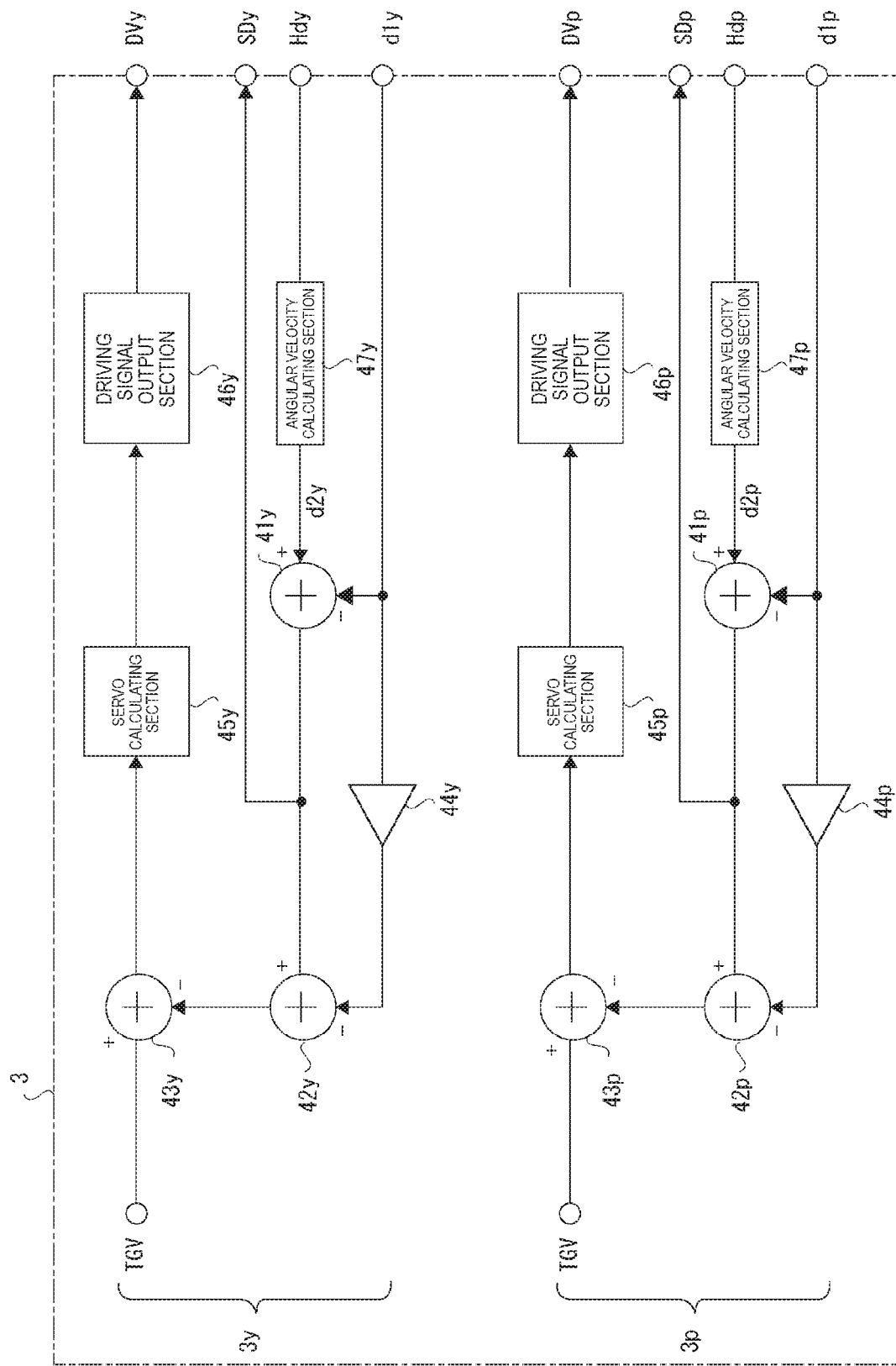
FIG. 12 is a block diagram of a shake correction calculating section in a second embodiment.

A constitution of the shake correction calculating section 3 in this case is shown in FIG. 12.

A point in FIG. 12 different from FIG. 9 is a point where angular velocity calculating sections 47y and 47p are added.

The angular velocity calculating section 47y converts the detection information (rotation angle) Hdy supplied from the rotation detecting section 24 into a value of an acceleration speed, and supplies the value to the subtractor 41y.

The angular velocity calculating section 47p converts the detection information (rotation angle) Hdp supplied from the rotation detecting section 24 into a value of an acceleration speed, and supplies the value to the subtractor 41p.

With this, similarly to the case of FIG. 9, the detection information d2y and d2p as angular velocity are obtained, and are supplied to the subtractors 41y and 41p. The subsequent constitution and operation are similar to those in the example in FIG. 9.

With such constitution, the rotation of the movable side lens unit 20 may be made to be detected by the hall elements.

5. Conclusion and Modified Embodiment

The above imaging device 1 in the first and second embodiments includes the movable side lens unit 20 that is supported rotatably in the yawing direction and the pitching direction within the casing 1A, the first rotation detecting section 9 that detects rotation applied to the casing 1A, and the second rotation detecting section 24 that detects rotation occurring on the movable side lens unit 20 within the casing 1A. Moreover, the imaging device 1 includes the shake correction calculating section 3 that generates the shake correction driving signals DVy and DVp by using the detection information d1y and d1p by the rotation detecting section 9 and the detection information d2y and d2p (or Hdy and Hdp) by the rotation detecting section 24, and the driving section 12 that drives the movable side lens unit 20 in the yawing direction and the pitching direction on the basis of the shake correction driving signals DVy and DVp.

In the case of correcting image shake of a captured image in the imaging device 1, it is required to detect appropriately the shake of the movable side lens unit 20, i.e., rotation in the yawing direction and rotation in the pitching direction. Then, the detection information regarding rotation applied to the whole casing 1A and rotation of the movable side lens unit 20 relative to the casing 1A is used. Since the detection information of the rotation detecting section 24 is information in which the angle of the shake of the casing 1A and the angle of the shake of the lens unit within the casing 1A have been synthesized, by the calculation of the detection information of the rotation detecting sections 9 and 24, it becomes possible to obtain appropriately an amount by which the movable side lens unit 20 is to be driven rotationally. That is, the rotation that makes image shake occur can be detected more correctly. With this, suitable correction of image shake is realized.

Moreover, in the embodiment, the shake correction calculating section 3 generates the shake correction driving signals DVy and DVp by using a difference value (output of the subtractors 41y and 41p) between the detection information of the rotation detecting section 9 and the detection information of the rotation detecting section 24.

As the difference value, the information regarding the shake of the movable side lens unit 20 can be acquired, and the value of the difference becomes information suitable for generation of the shake correction driving signal for the correction to the shake of the lens unit.

Moreover, in the embodiment, the fixed side lens unit 10 is disposed on the photographic subject side (object side) of the movable side lens unit 20, and the imaging optical system is formed by the movable side lens unit 20 and the fixed side lens unit 10. The shake correction calculating section 3 generates the shake correction driving signals DVy and DVp by using a difference value (output of the subtractors 42y and 42p) between the detection information of the rotation detecting section 9 and the detection information of the rotation detecting section 24 and a value (output of the multipliers 44y and 44p) reflecting a ratio of the correction angle of the movable side lens unit 20 relative to the rotation angle of the casing 1A.

With a relationship in optical property between the movable side lens unit 20 and the fixed side lens unit 10, a correction angle (angle to be driven for correction) relative to the rotation angle of the movable side lens unit 20 becomes a certain ratio relative to the rotation angle (shake angle) of the casing 1A. Then, the ratio is made to reflect on a shake correction driving signal.

With this, from the information regarding the shake of the movable side lens unit 20, it is possible to generate the shake correction driving signals DVy and DVp having reflected the correction angle corresponding to the relationship of the optical property.

Moreover, in the embodiment, the movable side lens unit 20 is disposed in a sealed state in the casing 1A of the imaging device 1. That is, as described in FIG. 1A and FIG. 1B, for example, the fixed side lens unit 10 is attached fixedly in the casing 1A, thereby forming a sealed structure in which a clearance is not caused in the casing 1A.

With this, it is possible to constitute the imaging device 1 excellent in dustproof and waterproofness, and it is possible to provide the imaging device 1 suitable for use in various activity scenes.

Usually, in the case of constituting an imaging optical system, for example, a lens unit including various kinds of lenses, a diaphragm mechanism, an image sensor, and so on as a movable unit in an imaging device casing and performing image shake correction, sealing properties become insufficient. The reason is that since a lens barrel portion constituted as the lens unit performs rotational movement within the imaging device, a peripheral portion in front (photographic subject side) of the lens unit cannot be covered fixedly with the casing of the imaging device, which causes a clearance. With this, it becomes disadvantageous in respect of dustproof and waterproofness. In the present embodiment, for example, the photographic subject side of the movable side lens unit 20 is sealed by the fixed side lens unit 10.

With this constitution, an imaging device excellent in dustproof and waterproofness is realized.

In this connection, in the embodiment, the object side is sealed using the fixed side lens unit 10. However, in place of this, it may be sealed with a protective glass and the like.

Moreover, as described in the above, the fixed side lens unit 10 being a separate body and other lens unit is attached in the casing 1A so as to block the photographic subject side (object side) of the movable side lens unit 20 so that the movable side lens unit 20 is disposed in a sealed state in the casing 1A. With this, the further effects can be acquired.

Namely, an imaging optical system is formed by the fixed side lens unit 10 and the movable side lens unit 20, and in this case, the fixed side lens unit 10 is made a state of being fixed to the casing 1A.

The photographic subject side is blocked with the fixed side lens unit 10, whereby the movable side lens unit 20 supported rotatably is not directly exposed when being seen from the outside of the casing 1A.

With this, in addition to the matter that it is possible to constitute the imaging device excellent in dustproof and waterproofness as mentioned in the above, by dividing the imaging optical system, it is possible to promote miniaturization and weight reduction of the movable side lens unit 20 supported rotatably. With this, it is possible to promote miniaturization of the drive system for shake correction, improvement in driving ability, miniaturization of the imaging device 1, low power consumption by reduction of driving electric power, and so on.

In this connection, by constituting some or all of lenses constituting the movable side lens unit 20 with a plastic lens, the weight of the movable side lens unit 20 driven when performing blur correction or changing a visual field, can be made light, and it becomes advantageous to suppress the power consumption at the time of driving.

Moreover, in the embodiment, the image processing section 4 is made to perform image distortion correction for captured image signals by using a difference value between detection information of the rotation detecting section 9 and detection information of the rotation detecting section 24 obtained by the shake correction calculating section 3, i.e., distortion correction information SDy and SDp being the outputs of the subtractors 41y and 41p.

In the case of separating the imaging optical system into a lens unit supported rotatably and other lens unit fixed to the casing 1A, dynamic image distortion occurs correspondingly to shake. In this case, since the image distortion becomes one corresponding to shake angle of the movable side lens unit 20 relative to the casing 1A, it becomes appropriate to use a difference value between detection information of the rotation detecting section 9 and detection information of the rotation detecting section 24 as the distortion correction information SDy and SDp.

In the first embodiment, the rotation detecting sections 9 and 24 are made as an angular velocity sensor. With this, rotation detection can be performed simply and precisely.

In particular, in the case where the rotation of the movable side lens unit 20 is detected by the angular velocity sensor, since it does not detect movement in the direction of the optical axis of the movable side lens unit 20, the lowering of the detection accuracy due to the occurring of shake in the optical axis direction, does not occur.

In the second embodiment, the rotation detecting section 9 is the angular velocity sensor, and the rotation detecting section 24 is made the position sensor using the hall element.

As the rotation detecting section 24 that detects the shake of the movable side lens unit 20 relative to the casing 1A, the hall element can be used also. With this, rotation detection can be performed simply and precisely.

In the embodiment, given is the example where the movable side lens unit 20 is supported rotatably in both the yawing direction and the pitching direction and the driving section 12 drives the movable side lens unit 20 in any direction of the yawing direction and the pitching direction. However, it should not be restricted to this.

For example, also considered is an example where the movable side lens unit 20 is supported rotatably in only the yawing direction, and driven rotationally in only the yawing direction by the driving section 12.

Similarly, also considered is an example where the movable side lens unit 20 is supported rotatably in only the pitching direction, and driven rotationally in only the pitching direction by the driving section 12.

In this connection, the effects described in the present specification are merely exemplification, and should not be limited, and there may exist other effects.

Additionally, the present technology may also be configured as below.

(1)

An imaging device, including:

a lens unit supported rotatably in at least one of a yawing direction or a pitching direction within a casing;

a first rotation detecting section that detects rotation applied to the casing;

a second rotation detecting section that detects rotation occurring on the lens unit within the casing;

a shake correction calculating section that generates a shake correction driving signal by using detection information by the first rotation detecting section and detection information by the second rotation detecting section; and a driving section that drives the lens unit in at least one of the yawing direction or the pitching direction on a basis of the shake correction driving signal.

(2)

The imaging device according to (1), in which the shake correction calculating section generates the shake correction driving signal by using a difference value between the detection information by the first rotation detecting section and the detection information by the second rotation detecting section.

(3)

The imaging device according to (1) or (2), in which another lens unit is disposed on a photographic subject side of the lens unit, and an imaging optical system is formed by the lens unit and the other lens unit, and the shake correction calculating section generates the shake correction driving signal by using a difference value between the detection information by the first rotation detecting section and the detection information by the second rotation detecting section and a value made to reflect a ratio of a correction angle of the lens unit relative to a rotation angle of the casing.

(4)

The imaging device according to any of (1) to (3), in which the lens unit is disposed in a sealed state within the casing.

(5)

The imaging device according to any of (1) to (4), in which the lens unit is disposed in a sealed state within the casing by attaching another lens unit with a state that a photographic subject side of the lens unit is blocked by the another lens unit.

(6)

The imaging device according to (3) or (5), including:

an image processing section that performs image processing for a captured image signal acquired by the lens unit, in which the image processing section performs image distortion correction for a captured image signal by using a difference value between the detection information by the first rotation detecting section and the detection information by the second rotation detecting section obtained by the shake correction calculating section.

(7)

The imaging device according to any of (1) to (6), in which the first rotation detecting section and the second rotation detecting section are angular velocity sensors.

(8)

The imaging device according to any of (1) to (6), in which the first rotation detecting section is an angular velocity sensor, and the second rotation detecting section is a position sensor using a hall element.

(9)

An image shake correcting method, as an image shake correcting method of an imaging device equipped with a lens unit supported rotatably in at least one of a yawing direction or a pitching direction within a casing and a driving section that drives the lens unit in at least one of the yawing direction or the pitching direction on a basis of a shake correction driving signal, including:

generating the shake correction driving signal by using detection information regarding rotation applied to the casing and detection information regarding rotation occurring on the lens unit within the casing.

REFERENCE SIGNS LIST

1 imaging device, 2 control section, 3 shake correction calculating section, 3y first calculating section, 3p second calculating section, 4 image processing section, 5 recording section, 6 display section, 7 communication section, 8 operating section, 9, 24 rotation detecting section, 10 fixed side lens unit, 12 driving section, 20 movable side lens unit, 21 movable side optical system, 22 imaging section, 23 optical system driving section, 41y, 42y, 43y, 41p, 42p, 43p subtractor, 44y, 44p multiplier, 45y, 45p servo calculating section, 46y, 46p driving signal output section, 47y, 47p angular velocity calculating section

The invention claimed is:

1. An imaging device, comprising:

a lens unit supported rotatably in at least one of a yawing direction or a pitching direction within a casing;

a first rotation detecting sensor that detects rotation applied to the casing;

a second rotation detecting sensor that detects rotation occurring on the lens unit within the casing;

a shake correction calculating circuitry that generates a first shake correction driving signal by using detection information by the first rotation detecting sensor and detection information by the second rotation detecting sensor; and a driving circuitry that drives the lens unit in at least one of the direction or the pitching direction on a basis of the shake correction driving signal, wherein a second lens unit is disposed on a photographic subject side of the lens unit, and an imaging optical system is formed by the lens unit and the second lens unit, and the shake correction calculating circuitry generates the first shake correction driving signal by using a difference value between the detection information by the first rotation detecting sensor and the detection information by the second rotation detecting sensor and a value made to reflect a ratio of a correction angle of the lens unit relative to a rotation angle of the casing.

2. The imaging device according to claim 1, wherein the shake correction calculating circuitry generates a second shake correction driving signal by using the difference value.

3. The imaging device according to claim 1, wherein the lens unit is disposed in a sealed state within the casing.

4. The imaging device according to claim 1, wherein the lens unit is disposed in a sealed state within the casing by attaching the second lens unit with a state that the photographic subject side of the lens unit is blocked by the second lens unit.

5. The imaging device according to claim 1, comprising:
an image processing circuitry that performs image processing for a captured image signal acquired by the lens unit,
wherein the image processing circuitry performs image distortion correction for the captured image signal by using the difference value.

6. The imagine device according to claim 1, wherein the first rotation detecting sensor and the second rotation detecting sensor are an alar velocity sensors.

7. The imaging device according to claim 1, wherein the first rotation sensor circuitry is an angular velocity sensor, and
the second rotation detecting sensor is a position sensor using a hall element.

8. An image shake correcting method, the method comprising:
generating, with a shake correction calculating circuitry, a first shake correction driving signal by using first detection information regarding rotation applied to a casing and second detection information regarding rotation occurring on a lens unit within the casing;
driving, with a driving circuitry, the lens unit in at least one of a yawing direction or a pitching direction on a basis of the first shake correction driving signal,
wherein a second lens unit is disposed on a photographic subject side of the lens unit, and an imaging optical system is formed by the lens unit and the second lens unit, and
the shake correction calculating circuitry generates the first shake correction driving signal by using a difference value between the first detection information and the second detection information and a value made to reflect a ratio of a correction angle of the lens unit relative to a rotation angle of the casing.

9. The imaging shake correcting method according to claim 8, further comprising:
generating, with the shake correction calculating circuitry, a second shake correction driving signal by using the first detection information and the second detection information regarding rotation;
driving, with the driving circuitry, the lens unit in at least one of the yawing direction or the pitching direction on the basis of the second shake correction driving signal, wherein the shake correction calculating circuitry generates the second shake correction driving signal by using the difference value.

10. The imaging shake correcting method according to claim 8, wherein the lens unit is disposed in a sealed state within the casing.

11. The imaging shake correcting method according to claim 8, wherein the lens unit is disposed in a sealed state within the casing by attaching the second lens unit with a state that the photographic subject side of the lens unit is blocked by the second lens unit.

12. The imaging shake correcting method according to claim 8, further comprising:
performing, with an image processing circuitry, image processing for a captured image signal acquired by the lens unit,
wherein the image processing includes performing image distortion correction for the captured image signal by using the difference value.

13. An imaging device, comprising:
a lens unit supported rotatably in at least one of a yawing direction or a pitching direction within a casing; and
an electronic processor, the electronic processor configured to:
determine a first rotation applied to the casing,
determine a second rotation occurring on the lens unit within the casing,
generate a first shake correction driving signal based on the first rotation that is determined and the second rotation that is determined,
drive the lens unit in at least one of the yawing direction or the pitching direction on a basis of the first shake correction driving signal,
wherein a second lens unit is disposed on a photographic subject side of the lens unit, and an imaging optical system is formed by the lens unit and the second lens unit, and
wherein the electronic processor is further configured to generate the first shake correction driving signal by using a difference value between the first rotation that is determined and the second rotation that is determined and a value made to reflect a ratio of a correction angle of the lens unit relative to a rotation angle of the casing.

14. The imaging device according to claim 13, wherein the electronic processor is further configured to
generate a second shake correction driving signal by using the difference value, and
drive the lens unit in at least one of the yawing direction or the pitching direction on a basis of the second shake correction driving signal.

15. The imaging device according to claim 13, wherein the lens unit is disposed in a sealed state within the casing.

16. The imaging device according to claim 13, wherein the lens unit is disposed in a sealed state within the casing by attaching the second lens unit with a state that the photographic subject side of the lens unit is blocked by the second lens unit.

17. The imaging device according to claim 13, wherein the electronic processor is further configured to
perform image processing for a captured image signal acquired by the lens unit,
wherein the image processing includes performing image distortion correction for the captured image signal by using the difference value.

* * * * *